No. 858,406. PATENTED JULY 2, 1907.
T. MIDGLEY.
APPARATUS FOR VULCANIZING RUBBER GOODS.
APPLICATION FILED AUG. 4, 1906.

Witnesses
Raphaël Netter
Baxter Morton

Thomas Midgley Inventor
By his Attorney Ernest Hopkinson

UNITED STATES PATENT OFFICE.

THOMAS MIDGLEY, OF HARTFORD, CONNECTICUT.

APPARATUS FOR VULCANIZING RUBBER GOODS.

No. 858,406. Specification of Letters Patent. Patented July 2, 1907.

Application filed August 4, 1906. Serial No. 329,142.

*To all whom it may concern:*

Be it known that I, THOMAS MIDGLEY, a citizen of the United States, residing in Hartford, Hartford county, Connecticut, have invented a new and useful Improvement in Apparatus for Vulcanizing Rubber Goods, of which the following is a specification.

This invention relates to apparatus for vulcanizing rubber goods, and it has particular reference to apparatus for vulcanizing the outer shoes or casings of pneumatic tires.

The primary object of the invention is to provide apparatus whereby shoes or casings for pneumatic tires may be subjected to extremely heavy pressure during the process of vulcanization.

Another object of the invention is to provide apparatus which will permit direct access of heated gas or vapor to the surface of a tire shoe or casing while being vulcanized under great pressure.

In carrying out my invention I preferably employ apparatus of substantially the character illustrated in the accompanying drawings, in which.

Figure 1:
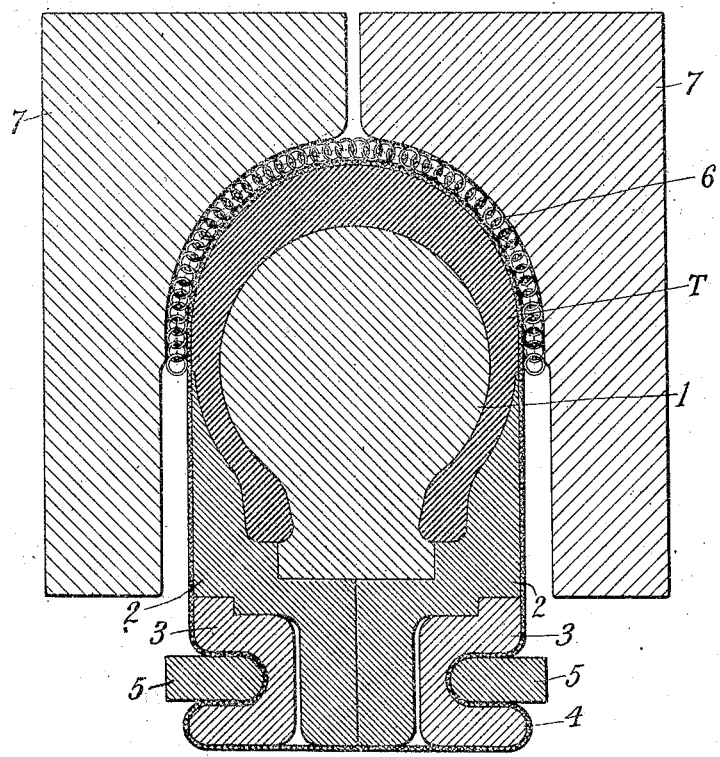
Figure 2:
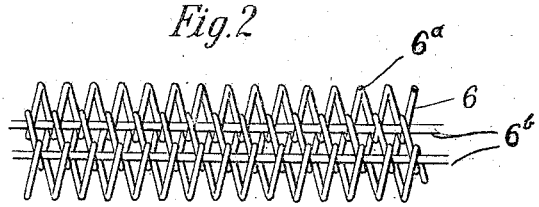

Figure 1 is a view in cross section through the apparatus forming the present invention, as applied to the outer shoe or casing of a pneumatic tire of the "Dunlop" type. Fig. 2 is a detail view showing the preferred mode of constructing the compression jacket.

Referring to the drawing by the reference characters, 1 designates a core of any suitable material and of annular form upon which the vulcanized tire shoe or casing T is seated. Annular clamping members 2 engage the marginal portions of the tire shoe and hold the shoe in proper position upon the core. Channeled rings 3 fitted in suitable seats therefor upon the clamping members 2, or formed integral with said clamping members, are provided for a purpose which will hereinafter be explained. A cover or wrapping 4 is carried around the tire shoe and the clamping members 2 and channeled rings 3, as clearly shown in the drawing. This wrapping or cover is preferably formed of thin cotton cloth which is both highly porous and characterized by considerable tensile strength, so that it forms an effective binder for the tire shoe which will hold it in form during the process of vulcanization and also permit the passage of the heated gas or vapor to the uncured stock of which the shoe or casing is formed. After the cover or wrapping 4 is applied over the tire shoe or casing and the supporting and clamping devices therefor, rings 5 are forced into the channels of the members 3, carrying with them the textile covering or wrapping 4 and greatly increasing the tension thereon. In this way a considerable degree of pressure over the tread portion of the tire shoe or casing is produced; but in order to produce a greater degree of pressure I apply over that portion of the wrapping or covering 4 which lies in direct contact with the tire shoe or casing, a jacket 6 which is preferably formed of helices or coils of wire $6^a$ and wires or cables $6^b$ for connecting the coils, and subject this jacket to any desired degree of pressure by means of clamping members 7 of the cross-section shown and preferably of annular form. The jacket 6 serves simply as a medium for transmitting the pressure of the clamping members 7 to the stock of the tire shoe or casing without preventing access of the heated gas or vapor to the tire shoe or casing during the vulcanizing process. As the jacket is formed of interlaced coils of wire and is of thoroughly open structure, free passage of gas or vapor therethrough is permitted and the stiffness of the individual coils or helices is such that any suitable degree of pressure can be transmitted through them to the textile covering or wrapping 4 and thence to the underlying material of the tire shoe or casing.

The peculiar structure of the jacket 6 makes it a very effective medium for transmitting the pressure of the clamping, or mold, members 7, because the individual coils or helices of which it is composed oppose great resistance to compression, while the jacket as an entirety changes its form and size very readily under pressure and also serves very effectively to prevent distortion of the tire shoe under the heavy pressure of the clamping members.

I have illustrated the invention as embodied in apparatus adapted to apply the additional pressure only over the tread of the tire shoe or casing and the adjacent portions of the sides, as it is upon these portions of the tire shoe or casing that the heaviest wear is received and where there is the greatest need of dense, homogeneous material. It is obvious, however, that the apparatus may easily be modified so as to permit the production of the additional pressure over the entire outer surface of the tire shoe or casing and also to afford access of the heated gas or vapor to the entire outer surface of the shoe or casing during the vulcanizing process.

After the apparatus shown in the drawing has been assembled in the manner indicated, suitable securing devices are employed to hold the rings 5 and the clamping members 7 in position and the entire structure is then subjected to the action of heat in a vulcanizing chamber. This heat may be dry or moist, as preferred, but live steam at suitable pressure is generally deemed preferable.

The apparatus described and illustrated fulfils both objects of the invention, and I prefer to make use of apparatus characterized by all the generic features of that; it is not essential to the attainment of the primary object of the invention that provision be made for the access of a heated gas or vapor to the surface of the tire shoe or casing.

Having thus described my invention, what I claim as new and desire to secure by Letters Patent is:

1. In apparatus of the character described, means for supporting an unvulcanized rubber article in form with a portion of the outer surface exposed, a porous covering for the exposed outer surface of said article, and means for applying pressure directly to said porous covering over the exposed surface of the rubber article without preventing access of gas or vapor to the surface over which the pressure is applied.

2. In apparatus of the character described, means for supporting an unvulcanized rubber article in form with a portion of its surface exposed, a porous covering for the exposed surface of said article, a flexible jacket or shell of open construction overlying said porous covering, and means for subjecting said jacket or shell to pressure and thereby compressing the rubber article without preventing access of gas or vapor thereto.

3. In apparatus of the character described, the combination with means for supporting an unvulcanized rubber article in form with a portion of the surface exposed, of a porous covering for the exposed surface of said article, a jacket or shell formed of wire helices or coils overlying said covering, and means for subjecting said jacket to pressure and thereby compressing said rubber article without preventing access of gas or vapor thereto.

4. In apparatus of the character described, the combination with means for supporting an article of unvulcanized rubber in form with a portion of the surface exposed, of a textile covering for said exposed surface, and means for applying pressure to said covering over said exposed surface without preventing access of gas or vapor to said covering.

5. In apparatus of the character described, the combination with a core for a tire shoe or casing, of means for securing the tire shoe or casing thereon with a portion of its surface exposed, means for holding the tire shoe or casing in form, and means for applying pressure to the exposed surface of the tire shoe or casing without preventing access of gas or vapor thereto during the process of vulcanization.

6. In apparatus of the character described, the combination with means for supporting an unvulcanized rubber article in form, of means retaining the article in form under heavy external pressure, and means for applying heavy external pressure to the article through the medium of the means for retaining it in form.

In testimony whereof, I have signed my name in the presence of two witnesses.

THOMAS MIDGLEY.

Witnesses:
  WM. BRADFORD,
  BAXTER MORTON.